United States Patent Office 3,213,076
Patented Oct. 19, 1965

3,213,076
SULFURIZATION OF SCHIFF BASE
Walter M. Budde, Jr., Minneapolis, Minn., assignor to Archer - Daniels - Midland Company, Minneapolis, Minn., a corporation of Delaware
No Drawing. Filed Apr. 19, 1962, Ser. No. 188,854
4 Claims. (Cl. 260—132)

This invention relates to an improved process for sulfurizing unsaturated organic compounds and the monomeric and polymeric products obtained therefrom. More particularly there is provided an improved process for sulfurization and polymerization of monomeric and polymeric olefins of alpha-beta and other mono and polyunsaturation with a reagent consisting of hydrogen polysulfides containing an average of over 2 sulfur atoms and the monomeric and polymeric polysulfides obtained therefrom.

Heretofore polysulfides have been made by reaction of alkyl halides with a sodium polysulfide, by reaction of disulfides with elemental sulfur or sulfurchloride or by reactions of olefins with sulfur. Of these reactions only the first gives a clean reproducible product.

Accordingly, an object of this disclosure is to provide the art with a clean, simple and economical new and useful alternative method of effecting a reaction of hydrogen polysulfide with olefins to obtain polysulfide polymers and copolymers thereby.

It is another object of this invention to provide an improved process of sulfurizing unsaturated organic compounds containing an unsaturated group or groups selected from the group consisting of $>C=C<$ and $$>C=N—$$

with hydrogen polysulfide wherein the average of sulfur content is over 2 atoms.

In general the reactions involved for obtaining hydrogen polysulfide comprise:

(1) $\quad Na_2S + S_{x-1} = Na_2S_xX = 2-4 \text{ or } 5$

The temperature range may vary from about 35–95° C. About 70° C. is preferred.

(2) $\quad Na_2S_x + 2HCl \rightarrow H_2S_x + 2NaCl$

The temperature range should be under 15° C. About −5° C. is preferred.

In reaction 1, the composition of the $Na_2S_x$ may vary from about $Na_2S_2$ up to about $Na_2S_4$ with an average composition of about $Na_2S_{2.5}$, that is the average $S_{2.5}$ is formed of $S_2$, $S_3$, $S_4$ and $S_5$ groups. There appears to be no advantage in going higher than $S_4$. In reaction 2, an excess of HCl is used for best results. The preferred range is 2 moles HCl/mole $Na_2S_x$ up to 6 moles HCl/mole $Na_2S_x$. In either case the components are simply mixed together and the reaction takes place. The temperature should be kept low, and for best results the $Na_2S_x$ is added to excess HCl. $H_2S_x$ separate directly as an oily liquid which is desirably extracted with a suitable non-reactive organic solvent such as benzene, carbontetrachloride, toluene, xylene and the like.

The $H_2S_x$ produced is then reacted with a liquid olefin material in a molar ratio to effect the following characteristic reactions:

(3) 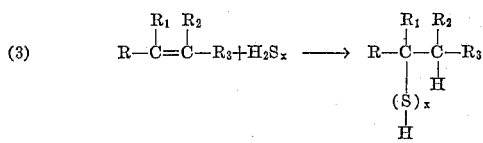

(3a) 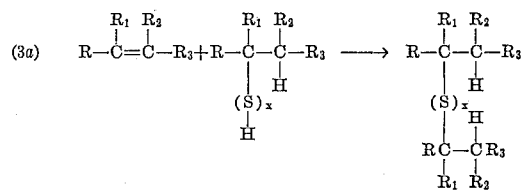

(4) 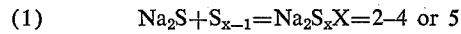

(4a) 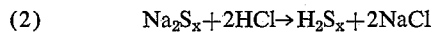

The reactions 3 and 4 may be run from room temperature up to about 120° C. and preferably under atmospheric pressure conditions in a time period of from about 2 to 36 hours. At room temperature many olefins are solids and accordingly they are made liquid by heating above the melting point or are dissolved in an inert or non-reaction solvent, in which the reactants are soluble. The time of treatment, at room temperature, varies from about 24 to 36 hours. This time is considerably reduced by refluxing during treatment, or initial treatment of the liquid olefin for about 10 to 12 hours at room temperature followed by continued reaction for about 2 hours under reflux conditions. Inert solvents may be, for example, benzene, toluene, carbontetrachloride and the like. R, $R_1$, $R_2$ and $R_3$ are representative of hydrogen or saturated and unsaturated aliphatic and aromatic carbon chains connected to one or more of the unsaturated $>C=C<$ and $>C=N—$ groups. The groups R, $R_1$, $R_2$ and $R_3$ may terminate in carboxyl, hydroxyl, ester, ether, nitrile, amide quaternary ammonium, carboxylic acid salts, sulfonic acid salts, amine salts, sulfur containing functional groups and the like. Under basic conditions, as with certain amines, the yields are low and their use is not preferred. Materials of the various types, which are treated with the crude hydrogen polysulfide and not rendered cyclic, are represented by the following non-limiting enumerations:

Ethylene
1-pentene
2-pentene
1-octene
2-octene
Cyclohexene
Schiff bases
Ketimines
Aldimines
Diallyl disulfide
Isobutylene
Isoprene
1,4-butadiene
polybutadiene
Styrene
Triolein
Dioleyl amine
Erucamide
Trimethyl oleyl Ammonium chloride
Divinyl benzene
Styrene-butadiene
    copolymers
Oleic acid
Acrylic acid and esters
Crotonic acid and esters
Dibutyl maleate
Cinnamic acid
Linoleyl alcohol
Vinyl stearate
Allyl benzoate
Oleylstearate
Soybean acids and esters
Sperm oil
Oleyl nitrile
Stearyl vinyl ethers
Oleyl acid sulfate From the above description it will be recognized that other similar unsaturated organic compounds as dibutyl fumarate, dioctyl maleate, or other similar alkyl aromatic polyester derivatives of alpha-beta and mono and poly unsturated organic compounds, including alkyl and aryl olefins, as alkyl styrenes, p-methoxystyrene, alpha methyl styrene, vinyl naphthalene and similar olefins; acrylic and substituted acrylic acids and their esters acrylonitrile, acrylamide, alpha and beta substituted acrylates, vinyl furan, alkyl vinyl ketones, alkyl vinyl ethers, vinyl acetate, vinyl carbazole, vinyl acetylene and unsaturated esters, alcohols, acids, ethers, nitriles, and the like, with or without non-reactive oxirane groups or other non-reactive substitution, and of the type olefinic compounds described which may be polymerized alone or in mixtures of two or more such compounds which are copolymerizable with each other through —CH=CH$_2$, >C=C<, —CH=CH—, —CH=C<, CH$_2$=C<, and >C=N— groups contained in the carbon chains, may be used to form the polysulfide monomers and polymers, the resultant product being dependent upon the mono or poly functionality of the unsaturated organic compounds as herein described.

The invention is further exemplified and illustrated by the following non-limiting examples.

Example I
PREPARATION OF ANALYSIS OF H$_2$S$_x$

A sodium polysulfide solution of approximately Na$_2$S$_{2.5}$ composition was made by stirring 100 parts of sulfur with a solution of 483 parts of Na$_2$S·9H$_2$O in 1317 parts of water at about 70° C. for about ½ hour.

Hydrogen polysulfide was generated by slowly adding 1000 parts of the above Na$_2$S$_{2.5}$ solution to 1500 parts of 1.0 N hydrochloric acid held at —10° C., with constant agitation. Following the addition the mixture was warmed to room temperature and 250 parts of benzene added. After the oily hydrogen polysulfide had been extracted by the benzene the aqueous layer was discarded and the benzene layer retained for use. The active sulfur content can be determined by adding 10 ml. of acetone to 1.00 gm. sample of the benzene solution and evaporating off volatile material in vacuum. The residual sulfur represents the active sulfur in the benzene solution. A typical preparation carried out as above contains 15% of active sulfur.

Example II
REACTION OF H$_2$S$_x$ WITH OCTENE-1

A solution of hydrogen polysulfide in benzene containing approximately 15% active sulfur (150 parts) was added slowly to 1-octene (50 parts) keeping the temperature at 30° C. The reaction was only slightly exothermic. After standing for 16 hours the mixture was refluxed for 2 hours. The solvent was then distilled off to a final temperature of 150° C. A residue of about 65 parts was obtained. After cooling and removal of precipitated free sulfur 62 parts of product remained. It showed an ebullioscopic molecular weight of 334 and contained 37% sulfur. A product having the formula C$_8$H$_{17}$SSSSC$_8$H$_{17}$ has a theoretical molecular weight of 354 and 36.2% sulfur.

Unexpectedly the polysulfide product contains considerably more sulfur than would be anticipated from the starting sodium polysulfide of average composition Na$_2$S$_{2.5}$. Instead of the structure of average composition C$_8$H$_{17}$S$_{2.5}$C$_8$H$_{17}$ there is obtained C$_8$H$_{17}$S$_4$C$_8$H$_{17}$.

Example III
REACTION OF H$_2$S$_x$ WITH BUTYL ACRYLATE

A solution (510 parts) of hydrogen polysulfide in toluene containing about 15.2% active sulfur was added slowly to a mixture of butyl acrylate (130 parts) in toluene (100 parts) at 9–11° C. After standing for 8 hours the mixture was refluxed for 3 hours. The solvent was then distilled off to a final temperature of 138° C. 208 parts of a brown colored residue was obtained. After cooling and removal of precipitated sulfur 180 parts of product remained. It showed an ebullioscopic molecular weight of 363, and contained 28% sulfur.

Example IV
REACTION OF H$_2$S$_x$ WITH OLEIC ACID

To a solution (260 parts) of hydrogen polysulfide in toluene containing about 15.2% active sulfur was added slowly a mixture of commercial grade oleic acid (141 parts) in toluene (175 parts). The addition was carried out over a period of 30 minutes at 21° C. The mixture was then refluxed for 4 hours. After cooling and removal of precipitated sulfur a proportion of 169 parts of light yellow oil was obtained. It contained 20.2% sulfur and had an apparent molecular weight of 1103.

Example V
REACTION OF H$_2$S$_x$ WITH SPERM OIL

To a solution of (300 parts) hydrogen polysulfide (15.2% active sulfur) in toluene was added 450 NW sperm oil (400 parts) over a period of 1.5 hours at 10–13° C. After standing for 2 hours the mixture was refluxed for 2 hours. After distilling off the solvent and removing precipitated sulfur the yield of light yellow oil was 440 parts. It contained 13.1% sulfur and showed an ebullioscopic molecular weight of 820.

Example VI
REACTION OF H$_2$S$_x$ WITH A SCHIFF BASE

To a solution (225 parts) of H$_2$S$_x$ in toluene containing 15% active sulfur was added a solution of lauryl amine benzaldehyde Schiff base (275 parts) in toluene (200 parts). The addition was carried out over a period of 0.5 hour at a temperature of 27–55° C. The reaction was accompanied by the evolution of H$_2$S gas and a considerable amount of heat. The partially solid mixture was refluxed for 2 hours. The solvent was removed under vacuum conditions up to a temperature of 82° C. at 29 in. mercury vacuum. The yellow residue (315 parts) was recrystallized from alcohol-water to afford shining yellow platelets melting sharply at 40.6–41.7° C. The purified material contained 4.45% nitrogen, 11.2% sulfur and showed an ebullioscopic molecular weight of 336. Theoretical for N-lauryl thiobenzamide is 4.59% N, 10.5% S, molecular weight 306.

As demonstrated by the above descriptions and examples, it will be recognized that this process is generally applicable to unsaturated organic compounds of mono- and poly unsaturation containing at least one active >C=C< or >C=N— group which may be substituted as such, or in mixed relationship, in the formulations illustrated without further encumbering this disclosure with unnecessary detail of repetition. It will further be recognized and understood that the unsaturated organic compounds will have various melting points and solubility characteristics in various solvents having different reflux temperatures and such solvents are inert to the herein described reaction conditions. Further, it will be recognized that while the preferred and most economical process is as described, it may be possible, in some instances, to effect the reaction under pressure conditions.

These polysulfides are useful as corrosion inhibitors, as flotation agents, curing agents for epoxy resins, lubricants, bactericides, and plasticizing agents for vinyl resins when used in a conventional manner as other plasticizing agents. The sulfurated compounds are also useful as chemical intermediates.

As different embodiments of this invention may be made without departing from the spirit and scope thereof, it is to be understood that the invention is not limited to the specific examples as it will be recognized that the substitution of other enumerated and similar unsaturated compounds can be similarly treated and products obtained in the manner and character defined in the appended claims.

I claim:
1. The process which comprises reacting a mixture consisting essentially of hydrogen polysulfide and a Schiff base at a hydrogen sulfide evolving temperature of from normal room temperature to 120° C. for from about 2 to 36 hours.
2. Product produced by the process of claim 1.
3. The process which comprises reacting a mixture consisting essentially of hydrogen polysulfide and lauryl amine-benzaldehyde Schiff base at a hydrogen sulfide evolving temperature of from normal room temperature to 120° C. for from about 2 to 36 hours.
4. Product produced by the process of claim 3, said product melting at 40.6°–41.7° C.

References Cited by the Examiner

UNITED STATES PATENTS

| | | | |
|---|---|---|---|
| 1,890,165 | 12/32 | Scott | 260—132 X |
| 2,061,018 | 11/36 | Carothers | 260—399 |
| 2,184,076 | 12/39 | Gottesmann | 260—399 |
| 2,280,578 | 4/42 | Hanford et al. | 260—551 |

FOREIGN PATENTS 408,638   4/34   Great Britain.

CHARLES B. PARKER, *Primary Examiner.*

TOBIAS E. LEVOW, *Examiner.*